(12) United States Patent
Bamberger et al.

(10) Patent No.: US 9,668,217 B1
(45) Date of Patent: *May 30, 2017

(54) SYSTEMS AND METHODS FOR WEARABLE INITIATED HANDSHAKING

(71) Applicant: Snapchat, Inc., Venice, CA (US)

(72) Inventors: Alex Bamberger, Venice, CA (US);
Peter Brook, Marina del Rey, CA (US);
Nicolas Dahlquist, Venice, CA (US);
Matthew Hanover, Los Angeles, CA (US); Russell Douglas Patton, Marina Del Rey, CA (US); Jonathan M Rodriguez, II, San Antonio, TX (US)

(73) Assignee: SNAP INC., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,179

(22) Filed: May 14, 2015

(51) Int. Cl.
| H04B 7/00 | (2006.01) |
| H04W 52/02 | (2009.01) |
| H04W 52/38 | (2009.01) |
| H04W 36/14 | (2009.01) |
| H04W 4/00 | (2009.01) |
| H04B 1/00 | (2006.01) |

(52) U.S. Cl.
CPC ....... *H04W 52/0229* (2013.01); *H04W 4/008* (2013.01); *H04W 36/14* (2013.01); *H04W 52/383* (2013.01)

(58) Field of Classification Search
CPC ............... H04W 84/18; H04M 1/7523; H04M 1/72522
USPC ..................................... 455/41.2, 556.1, 557
See application file for complete search history.

(56) References Cited

U.S. PATENT DOCUMENTS

| 2007/0030442 | A1 | 2/2007 | Howell et al. |
| 2008/0045152 | A1 | 2/2008 | Boes |
| 2009/0034498 | A1 | 2/2009 | Banerjea et al. |
| 2010/0015919 | A1 | 1/2010 | Tian |
| 2011/0096168 | A1 | 4/2011 | Siann et al. |
| 2012/0033594 | A1 | 2/2012 | Kalbag |
| 2012/0224070 | A1 | 9/2012 | Burroff et al. |
| 2013/0329183 | A1 | 12/2013 | Blum et al. |
| 2013/0331098 | A1 | 12/2013 | Balasubramaniyan et al. |
| 2014/0185604 | A1 | 7/2014 | Kil et al. |

OTHER PUBLICATIONS

"U.S. Appl. No. 14/712,104, Non Final Office Action mailed Aug. 11, 2015", 34 pgs.

(Continued)

*Primary Examiner* — Lee Nguyen
(74) *Attorney, Agent, or Firm* — Schwegman Lundberg & Woessner, P.A.

(57) ABSTRACT

Systems and methods for device handshaking are described. Embodiments for client device and associated wearable device initiated handshaking are described. In certain embodiments, a device such as wearable camera eyeglasses having both high-speed wireless circuitry and low-power wireless circuitry communicates with a client device. The low-power wireless circuitry is used for signaling and to manage power on handshaking for the high-speed circuitry in order to reduce power consumption. An analysis of a high-speed connection status may be performed by a client device, and used to conserve power at the glasses with signaling from the client device to indicate when the high-speed circuitry of the glasses should be powered on.

20 Claims, 11 Drawing Sheets

(56) References Cited

OTHER PUBLICATIONS

"U.S. Appl. No. 14/712,104, Decision received Sep. 15, 2016 to Pre-Appeal Brief Request filed Sep. 2, 2016", 2 pgs.
"U.S. Appl. No. 14/712,104, Examiner Interview Summary mailed Jan. 14, 2016", 3 pgs.
"U.S. Appl. No. 14/712,104, Final Office Action mailed Mar. 4, 2016", 39 pgs.
"U.S. Appl. No. 14/712,104, Pre-Appeal Brief Request filed Sep. 2, 2016", 3 pgs.
"U.S. Appl. No. 14/712,104, Response filed Jan. 11, 2016 to Non Final Office Action mailed Aug. 11, 2015", 13 pgs.
"U.S. Appl. No. 14/712,104, Appeal Brief filed Dec. 2, 2016", 28 pgs.

SYSTEMS AND METHODS FOR WEARABLE INITIATED HANDSHAKING

BACKGROUND

Many digital devices are configured to use sensors to gather data that is to be shared via a network. As part of such information sharing, connections with other devices need to be established. While in many known systems this data transfer may be done via a wired connection, wireless communications involve a wireless "handshaking" process to connect devices. Such connection processes may be energy intensive, and use significant portions of a device's battery resources.

Systems and methods described herein include devices with improved device communication handshaking and power consumption.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
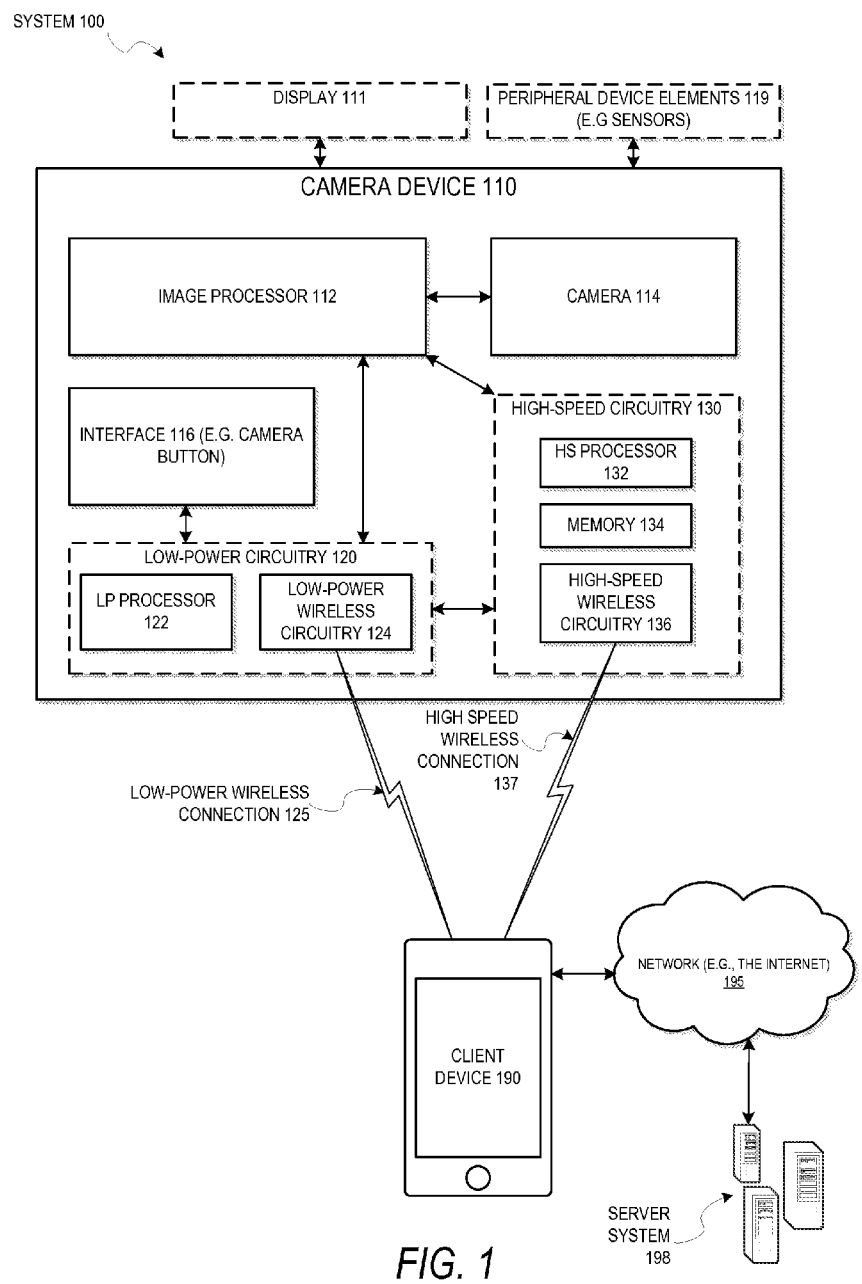
FIG. 1 is a block diagram illustrating a networked system including details of a camera device, according to some example embodiments.

Embodiments described herein relate to devices, systems, and methods for wireless handshaking and subsequent data transfer between devices. One example embodiment may include a communication handshake between a smartphone and wearable eyeglasses with an integrated camera. Various other embodiments involve other camera devices, display devices, eyeglasses with multiple display and sensor systems, or other such wearable devices. These devices communicate with a client device such as a smartphone, a laptop computer, a tablet computer, or any other such computing device. Various embodiments may use a low-power wireless connection for basic signaling and a high-speed wireless connection for transfer of large amounts of data such as camera data.

For example, in the embodiment with a pair of glasses having an integrated camera, size and weight restrictions limit the amount of battery power and memory storage available. An associated client device such as a smartphone, while also having limited memory and battery power, will have significantly greater flexibility in providing memory and battery resources. The smartphone is used in such embodiments to receive camera data from the glasses, to store the camera data for later viewing on the smartphone, and for communication to other users via a network such as the Internet. This operation on the smartphone may, for example, be implemented using applications such as a Snapchat™ application.

Due to the battery limitations on the glasses, however, maintaining a high-speed wireless connection to the smartphone using a standard Bluetooth™ or Wi-Fi connection will quickly exhaust the battery of the glasses. By contrast, in certain embodiments a low-power wireless connection using Bluetooth low energy (LE) may operate for weeks or months from a single battery charge on a small battery integrated with a standard-sized eyeglass frame. Such a low-power connection, however, does not provide sufficient bandwidth to transfer significant amounts of camera data to a smartphone. In the example embodiment with the pair of glasses, the glasses therefore include an integrated camera as well as both low-power wireless circuitry and separate high-speed wireless circuitry that may both be used for communication with the smartphone. The low-power wireless circuitry is used for low-power communications with the smartphone over long periods of time. The low-power communications include device-to-device signaling as well as efficient control of the high-speed circuitry to conserve battery charge on the glasses. The high-speed circuitry is used to transfer data between the glasses and the smartphone, and is automatically powered down when not in use. Use of the low-power circuitry to minimize the use of the high-speed circuitry provides improved usage time on a single battery charge.

Continuing with the above example embodiment, when the glasses have a battery charge and are operating in a low-power state, the glasses periodically send a low duty cycle advertising communication as part of low-power wireless circuitry operation. The smartphone can respond to this communication with a connection request to establish a low-power wireless connection, and may also respond with various monitoring and control communications. This may include battery, memory use, and camera data status details for the glasses. In various other embodiments, other methods of establishing a low-power wireless connection may be used, including any method described in the Bluetooth specification and particularly in Bluetooth Core System Package [Low Energy Controller] specification portions. Depending on the low-power connection method, either the glasses or the smartphone may monitor the availability of the connection, and either may initiate further handshaking for data transfer on a high-speed wireless connection.

When picture or video camera data is captured by the camera of the glasses, the glasses may verify that the smartphone is available. A low-energy communication may then be used to ask the smartphone if the glasses should use energy to turn on high-speed circuitry of the glasses. The smartphone determines, based on various factors, whether a high-speed connection is likely to be made successfully. If the smartphone does not respond or sends a negative response via the low-energy connection, the glasses maintain a low-power state without using energy to turn on high-speed circuitry in an attempt to make the high-speed connection. If the smartphone communicates a positive response on the low-energy connection, the glasses power on the high-speed circuitry and attempt to establish a high-speed connection to the smartphone. After the camera data is transferred or the high-speed connection fails, the high-speed circuitry of the glasses is powered down and the glasses return to a low-power state. In various embodiments, similar handshaking may be initiated by an application operating on the smartphone to request data from the glasses.

Additionally, while the above example details a pair of glasses with an integrated camera transferring data to a smartphone, other embodiments include client devices other than a smartphone that may use the communication handshaking embodiments described herein to communicate with various devices other than glasses with an integrated camera. Examples of such devices include network enabled watches, hats, armbands, climbing harnesses, belts, masks, necklaces, armbands, swimming gear, or any other such wearable objects that may include an integrated sensors.

FIG. 1 is a block diagram illustrating a networked system 100 including details of a camera device 110, according to some example embodiments. In certain embodiments, camera device 110 may be implemented as glasses 31 of FIG. 6 described below.

System 100 includes camera device 110, client device 190, and server system 198. Client device 190 may be a smartphone, tablet, phablet, laptop computer, desktop computer, networked appliance, access point device, or any other such device capable of connecting with camera device 110 using both a low-power wireless connection 125 and a high-speed wireless connection 137. In system 100, client device 190 is connected to server system 198 and network 195. In other embodiments, a connection to a network 195 may be intermittent, or may be made using the same circuitry of client device 190 that is used for high-speed wireless connection 137, such that a high-speed wireless connection 137 to camera device 110 and a connection to network 195 are not possible from client device 190 at the same time. In other embodiments, client device 190 may circuitry for more than two wireless connections at a time. These connections may be implemented, for example, using any combination of Bluetooth, Bluetooth LE, Wi-Fi, Wi-Fi direct, a cellular modem, and a near field communication system, as well as multiple instances of any of these systems.

The network 195 may include any combination of wired and wireless connections, and may be any local area network (LAN), wide area network (WAN), or may be the Internet. Server system 198 may be one or more computing devices as part of a service or network computing system. In certain embodiments, server system 198, client device 190, and camera device 110 work together to implement an application service for sharing data from camera device 110 and/or client device 190 with other networked client devices via network 195 and server system 198. Client device 190 and any elements of server system 198 and network 195 may be implemented using details of software architecture 902 or machine 1100 described in FIGS. 9 and 11.

System 100 may optionally include additional peripheral device elements 119 and/or a display 111 integrated with camera device 110. Such peripheral device elements 119 may include biometric sensors, location sensors, motion sensors, temperature sensors, additional camera sensors, display elements integrated with camera device 110. Examples of peripheral device elements 119 are discussed further with respect to FIGS. 9 and 11. For example, peripheral device elements 119 may also include any I/O components 1150 including output components 1152, motion components 1158, or any other such elements described herein. Example embodiments of a display 111 are discussed in FIGS. 7 and 8.

Camera device 110 includes camera 114, image processor 112, interface 116, low-power circuitry 120, and high-speed circuitry 130. Camera 114 includes digital camera elements such as a charge coupled device, a lens, or any other light capturing elements that may be used to capture data as part of camera 114.

Interface 116 refers to any source of a user command that is provided to camera device 110. In one implementation, interface 116 is a physical button on a camera that, when depressed, sends a user input signal from interface 116 to low-power processor 122. A depression of such a camera button followed by an immediate release may be processed by low-power processor 122 as a request to capture a single image. A depression of such a camera button for a first period of time may be processed by low-power processor 122 as a request to capture video data while the button is depressed, and to cease video capture when the button is released, with the video captured while the button was depressed stored as a single video file. In certain embodiments, the low-power processor 122 may have a threshold time period between the press of a button and a release, such as 500 milliseconds or one second, below which the button press and release is processed as an image request, and above which the button press and release is interpreted as a video request. The low-power processor 122 may make this determination while the image processor 112 is booting. In other embodiments, the interface 116 may be any mechanical switch or physical interface capable of accepting user inputs associated with a request for data from the camera 114. In other embodiments, the interface 116 may have a software component, or may be associated with a command received wirelessly from another source.

In certain embodiments, each press of a button or initiation of a user action may initiate video recording. If a subsequent release or other adjustment or change in the user action indicates a request to capture a single image, that image may simply be selected from the captured video frames. In certain such embodiments, image processing or computer vision analysis may be used to extract a frame from the captured video frames determined to have a highest image quality or a highest content quality from all of the frames of the captured video frames. Such embodiments provide an additional means for avoiding a delay while a determination of whether a user input is associated with a video request or a single image request.

Image processor 112 includes circuitry to receive signals from the camera 114 and process those signals from the camera 114 into a format suitable for storage in the memory 134. Image processor 112 is structured within camera device 110 such that it may be powered on and booted under the control of low-power circuitry 120. Image processor 112 may additionally be powered down by low-power circuitry 120. Depending on various power design elements associated with image processor 112, image processor 112 may still consume a small amount of power even when it is in an off state. This power will, however, be negligible compared to the power used by image processor 112 when it is in an on state, and will also have a negligible impact on battery life. As described herein, device elements in an "off" state are still configured within a device such that low-power processor 122 is able to power on and power down the devices. A device that is referred to as "off" or "powered down" during operation of camera device 110 does not necessarily consume zero power due to leakage or other aspects of a system design.

In one example embodiment, image processor 112 comprises a microprocessor integrated circuit (IC) customized for processing sensor data from camera 114, along with volatile memory used by the microprocessor to operate. In order to reduce the amount of time that image processor 112 takes when powering on to processing data, a non-volatile read only memory (ROM) may be integrated on the IC with instructions for operating or booting the image processor 112. This ROM may be minimized to match a minimum size needed to provide basic functionality for gathering sensor data from camera 114, such that no extra functionality that would cause delays in boot time are present. Additionally, the IC may be coupled to a separate electrically erasable programmable read only memory (EEPROM) that stores additional elements of the operating code. The EEPROM may be configured with direct memory access (DMA) to the volatile memory of the microprocessor of image processor 112. DMA allows memory-to-memory transfer of data from the EEPROM to system memory of the image processor 112 independently of operation of a main controller of image processor 112. Providing DMA to this EEPROM further reduces the amount of time from power on of the image processor 112 until sensor data from the camera 114 can be processed and stored. In certain embodiments, minimal processing of the camera signal from the camera 114 is performed by the image processor 112, and additional processing may be performed by applications operating on the client device 190 or server system 198.

Low-power circuitry 120 includes low-power processor 122 and low-power wireless circuitry 124. These elements of low-power circuitry 120 may be implemented as separate elements or may be implemented on a single IC as part of a system on a single chip. Low-power processor 122 includes logic for managing the other elements of the camera device 110. As described above, for example, low-power processor 122 may accept user input signals from an interface 116. Low-power processor 122 may also be configured to receive input signals or instruction communications from client device 190 via low-power wireless connection 125. Additional details related to such instructions are described further below. Low-power wireless circuitry 124 includes circuit elements for implementing a low-power wireless communication system. Bluetooth™ Smart, also known as Bluetooth™ low energy, is one standard implementation of a low-power wireless communication system that may be used to implement low-power wireless circuitry 124. In other embodiments, other low-power communication systems may be used.

High-speed circuitry 130 includes high-speed processor 132, memory 134, and high-speed wireless circuitry 136. High-speed processor 132 may be any processor capable of managing high-speed communications and operation of any general computing system needed for camera device 110. High-speed processor 132 includes processing resources needed for managing high-speed data transfers on high-speed wireless connection 137 using high-speed wireless circuitry 136. In certain embodiments, the high-speed processor 132 executes an operating system such as a LINUX operating system or other such operating system such as operating system 904 of FIG. 9. In addition to any other responsibilities, the high-speed processor 132 executing a software architecture for the camera device 110 is used to manage data transfers with high-speed wireless circuitry 136. In certain embodiments, high-speed wireless circuitry 136 is configured to implement Institute of Electrical and Electronic Engineers (IEEE) 802.11 communication standards, also referred to herein as Wi-Fi. In other embodiments, other high-speed communications standards may be implemented by high-speed wireless circuitry 136.

Memory 134 includes any storage device capable of storing camera data generated by the camera 114 and image processor 112. While memory 134 is shown as integrated with high-speed circuitry 130, in other embodiments, memory 134 may be an independent standalone element of the camera device 110. In certain such embodiments, electrical routing lines may provide a connection through a chip that includes the high-speed processor 132 from the image processor 112 or low-power processor 122 to the memory 134. In other embodiments, the high-speed processor 132 may manage addressing of memory 134 such that the low-power processor 122 will boot the high-speed processor 132 any time that a read or write operation involving memory 134 is needed.

Figure 2:
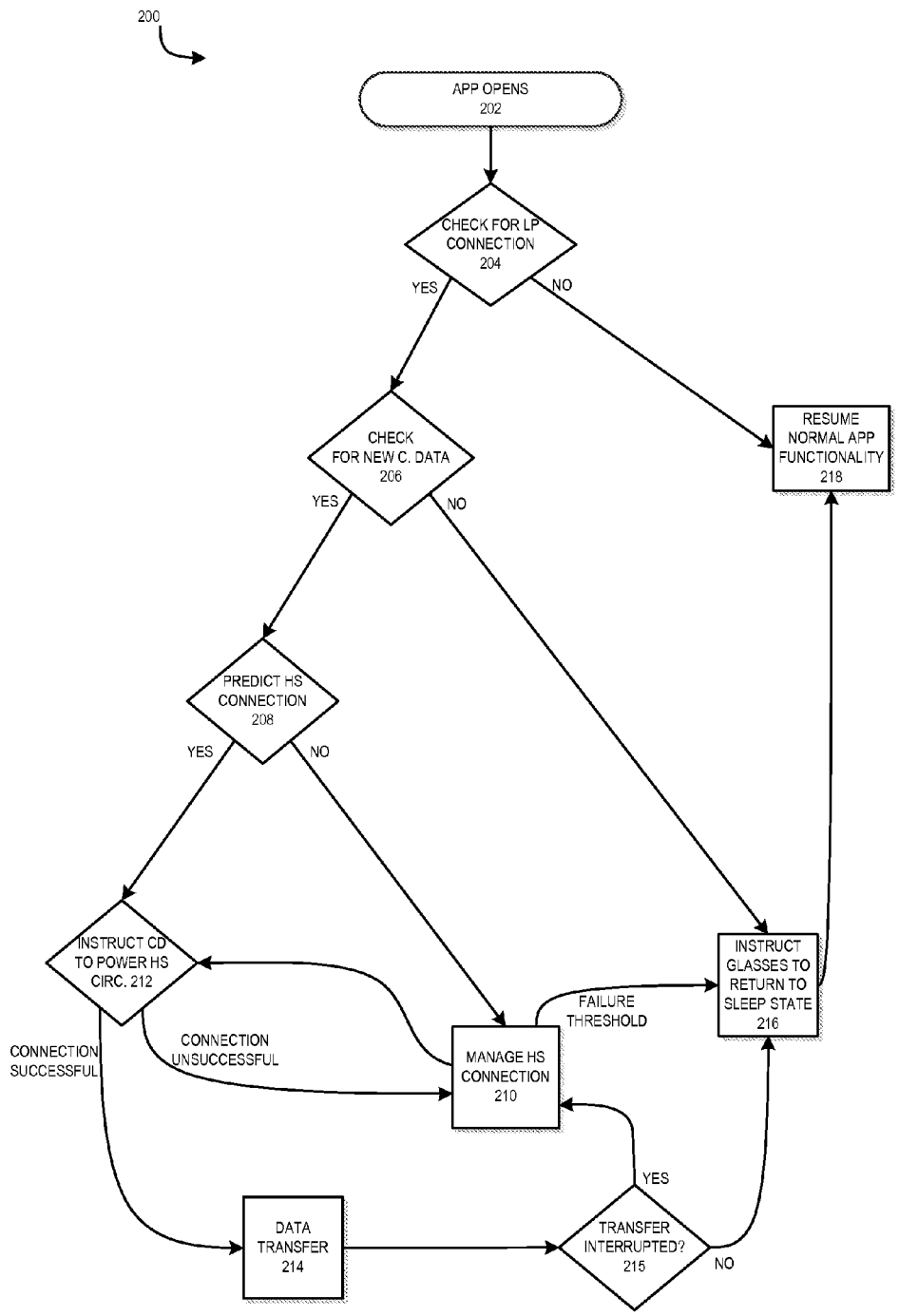
FIG. 2 is a flow diagram illustrating aspects of communication handshaking according to some example embodiments.

FIG. 2 is a flow diagram illustrating aspects of communication handshaking according to some example embodiments. FIG. 2 illustrates method 200 as an embodiment including both connection handshaking and data transfer. While method 200 may be implemented in a variety of systems using different devices and device types, for the purposes of illustration method 200 is described with respect to system 100 of FIG. 1. Method 200 describes a client device initiated handshake triggered by an application launch on client device 190. Additional examples of triggers for handshaking as well as camera device initiated handshaking embodiments are also described herein, particularly in FIG. 4.

In operation 202, an application is opened on client device 190. This application may be any application 910 described with respect to device 900. For example, this application may be a dedicated camera device application 967, or a social media application 960. In the example embodiment of method 200, the opening or initial execution of the application operation 202 is a trigger which initiates a check to determine if a high-speed data transfer via a high-speed wireless connection 137 is needed between a client device 190 and a camera device 110. As such, method 200 is considered a client device 190 initiated handshake. In other embodiments, other triggers on client device 190 may initiate such a handshake. For example, an application on client device 190 may periodically initiate a check for information from camera device 110, or a user input at a user interface of an application operating on client device 190 may initiate a check for data on camera device 110 that requires a high-speed wireless connection 137. In further embodiments using a device other than camera device 110, the trigger may be a process to push data to the other device. For example, a high-speed wireless connection 137 may be initiated by a client device 190 video data push from client device 190 to glasses with a display such as those described in FIGS. 7 and 8 so that video data can be displayed on the glasses. In still further embodiments, the handshake may be initiated by camera device 110 as described below in more detail with respect to FIGS. 4 and 5.

In operation 204, the application operating on client device 190 verifies that a low-power wireless connection 125 is available from camera device 110 to client device 190. If such a connection is not already available, it may be initiated by the application. As described above, low-power wireless connection 125 may be a Bluetooth LE connection.

In certain embodiments, a background service 922 of an operating system 904 operating on client device 190, or another element of client device 190 may operate in a Bluetooth LE scanning state. Camera device 110 may operate a corresponding Bluetooth LE advertising state. For example, camera device 110 may broadcast an advertising communication at a specified interval (e.g. 1 millisecond, 10 seconds, or another such interval.) The scanning state on client device 190 may track such advertising communications from camera device 110 to determine if the low-power wireless connection 125 is available. If so, a connection request is sent from client device 190 to camera device 110 to establish a Bluetooth LE connection. In some embodiments, a whitelist operating on camera device 110 may be used to determine if a connection from client device 190 is accepted. Such a whitelist may be based on a media access control (MAC) number associated with client device 190, a universal unique identifier (UUID) associated with client device 190, or some other identifier associated with client device 190 and previously set at camera device 110. In other embodiments, other methods may be used to establish low-power wireless connection 125. If no low-power connection is available or a connection cannot be completed (e.g. no response to a connection request is received) then the application on client device 190 operates without a connection to camera device 110 in operation 218.

If a low-power wireless connection 125 is established, then in operation 206, a check is performed for new camera data stored in memory 134 of camera device 110. This check may consist of a simple request from client device 190 and a response received from camera device 110 indicating that some camera data is in memory 134. In other embodiments, a list of file names in memory 134 may be communicated. If no such data is present in memory 134, then the camera device 110 returns to a standby or sleep state (e.g. resuming periodic advertising communications in some Bluetooth LE embodiments) and the application continues with non-connected function in operation 218 just as above.

In certain embodiments, the check for new camera data may additionally involve a data threshold size check. If the amount of new data for transfer is below a threshold size, then the low-power wireless connection 125 may be used to transfer the new data in memory 134. This may operate, for example, to transfer single images or low resolution images via a low-power wireless connection 125, with the use and associated power consumption of high-speed wireless connection 137 reserved for video data, large sets of images, or high-resolution images.

If client device 180 receives a communication indicating that new camera data to be transferred is present on camera device 110, then client device 190 performs a check to predict whether a high-speed connection is likely to be made successfully. For example, in certain embodiments, client device 190 is only able to make one high-speed wireless connection 137 at a time. If, for example, the circuitry on client device 190 for high-speed wireless connection 137 is in use to connect client device 190 to network 195, then operation 208 will identify that high-speed wireless connection 137 to camera device 110 is not available. In other embodiments, sensor data may be used to determine that it is unlikely that high-speed wireless connection 137 will be established, even if the circuitry of client device 190 is available.

If client device 190 determines that a high-speed connection is unlikely, then in operation 210, client device 190 manages systems for establishing high-speed wireless connection 137. In certain embodiments, automatic network adjustment commands may be communicated between client device 190 and camera device 110 to improve connection success. This may include communicating different channels for connections, or other connection settings. Additionally, in certain embodiments a user interface may be presented on a display of client device 190 prompting the user to disconnect from a current high-speed wireless connection in order to enable high-speed wireless connection 137 to be established with camera device 110. In other embodiments, as part of operation 210, a trigger may be set to automatically establish high-speed wireless connection 137 to camera device 110 when an existing high-speed wireless connection of client device 190 to network 195 is disconnected. Use of the prediction in operation 208 and the high-speed connection management in operation 210 preserves battery power at camera device 110 by preventing camera device 110 from powering on high-speed circuitry 130 until the system determines that high-speed wireless connection 137 is likely to be established. In various embodiments, additional timing and history operations or any other such inputs may be incorporated into the decision making used to determine when high-speed circuitry 130 is to be powered on.

In operation 212, once client device 190 has either made an initial determination that successful creation of high-speed wireless connection 137 is likely, or a trigger in operation 210 has prompted an attempt to establish high-speed wireless connection 137, then client device 190 sends a communication on low-power wireless connection 125 instructing camera device 110 to power on high-speed circuitry 130. High-speed circuitry 130 then attempts to establish high-speed wireless connection 137 with client device 190.

If the connection is unsuccessful, operation 210 involves further managing the high-speed connection. As part of operation 210, high-speed circuitry 130 and client device 190 may repeatedly attempt to establish high-speed wireless connection 137. When a failure threshold is reached, which may be a certain number of reconnect attempts or a certain time period with high-speed circuitry 130 powered on without a successful connection, then client device 190 may communicate an instruction on low-power wireless connection 125 for camera device 110 to power down high-speed circuitry 130 and to return to a sleep state in operation 216. This failure may be used in future prediction operations 208 and in management of high-speed connections in future instances of operation 210. For example, a connection failure history may be presented to a user as part of operation 210 in certain embodiments, along with recommended setting changes to reduce connection failures.

If high-speed wireless connection 137 is successfully established following operation 212, then operation 214 involves transfer of data from memory 134 to client device 190. If, as part of such a transfer, an interruption occurs in an operation 215, then high-speed connection management occurs again in operation 210 as described above. If no interruption of data transfer operation 214 occurs, then following completion of the data transfer, client device 190 communicates an instruction via low-power wireless connection 125 for camera device 110 to power down high-speed circuitry 130 and return to a sleep state in operation 216.

In various embodiments, this handshaking and data transfer described above may operate as a background process of the application operating on client device 190. In other embodiments, a user interface may display a data transfer progress bar or handshaking status alerts on a display of client device 190. In either embodiment, following successful transfer of data or failure of successful transfer, an alert may be provided as part of application operation, and the application will then return to a normal operation mode in operation 218 with no data transfer or handshaking operation occurring.

Figure 3:
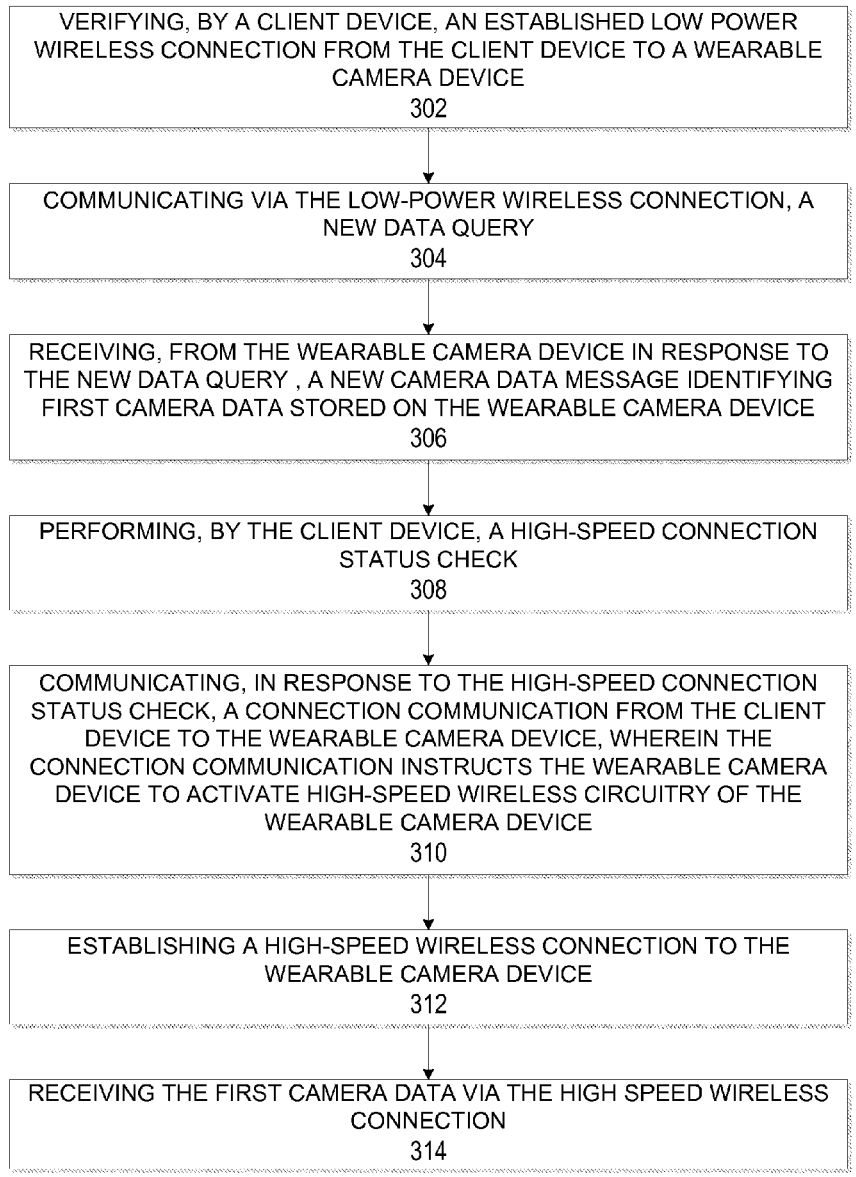
FIG. 3 is a diagram illustrating a method of communication handshaking according to some example embodiments.

FIG. 3 is a diagram illustrating a method 300 of communication handshaking according to some example embodiments. Just as with method 200, method 300 is described for illustrative purposes with respect to system 100. Method 300 may, in various alternative embodiments, be implemented using different devices than those described below.

Operation 302 involves verifying, by a client device 190, an established low-power wireless connection 125 from the client device 190 to a wearable camera device 110. As described above, this may be a Bluetooth LE connection operating according to any Bluetooth specification including LE standards. In other embodiments, this may be any other low-power wireless connection, including low-power optical or infrared near field communication.

Operation 304 involves communicating, via the low-power wireless connection 125 from client device 190 to camera device 110, a new data query. The new data query functions as a client device 190 initiated request to determine if camera device 110 includes data that has not yet been transferred to client device 190. In certain embodiments, communication of the new data query may be initiated by launch of an application on client device 190 as discussed with respect to method 200. For example, the application may be a social media application for sharing camera data from camera device 110 with other users of a social media application managed by server system 198. Launch of such an application on client device 190 may initiate an automatic new data query with an associated transfer of camera data and a user interface for sharing the camera data with other application users via network 195 and server system 198. In other embodiments, a new data query may be periodically issued by an application operating on client device 190 at regular time intervals. In still further embodiments, a user input provided at a touch-screen user-interface display of client device 190 as part of an application operation may initiate a new data query. In other embodiments, other such triggers or regular new data checks may be used to initiate a new data query from client device 190 to camera device 110.

Operation 306 involves receiving, from the wearable camera device 110 in response to the new data query, a new camera data message identifying first camera data stored on a memory 134 of the wearable camera device 110. While method 300 particularly discusses camera data, in various other embodiments, other data types may be transferred as part of various different systems. For example, in certain embodiments other sensors or peripheral device elements 119 may be present. A query of operation 304 and a response of operation 306 may be associated with data from such peripheral devices 119 instead of from camera 114 in various embodiments. In other embodiments, operation 304 may be replaced by an operation requesting to push data for presentation on a display 111 of camera device 110, and operation 306 may be a response indicating that memory 134 has space available for the data and the device is ready to receive the data. In still further embodiments, other data transfer operations may be implemented to exchange data between a camera device 110 or another such device having low-power circuitry 120 and high-speed circuitry 130, with the other device to communicate with a client device 190 to both send and receive various types of data.

As part of operation 306, other data may be included with the new camera data message. This may include battery levels, memory settings associated with auto-delete of data on transfer, memory use status, details of other recent data transfers to client device 190 or other client devices, or any other such status communications that may be sent on a low-power wireless connection 125.

Operation 308 then involves performing, by the client device 190, a high-speed connection status check. A high-speed connection status check, as described herein, refers to a client device 190 verification that client device 190 is ready to establish a high-speed wireless connection 137 prior to camera device 110 using power by powering up high-speed circuitry 130. This is done to limit power usage on camera device 110 when a high-speed connection 137 is unavailable or likely to fail. For example, as described above, client device 190 may use Institute of Electrical and Electronics Engineers (IEEE) 802.11 (Wi-Fi) circuitry for high-speed communications. While some such embodiments may use systems such as Wi-Fi direct or multiple Wi-Fi circuits, other client devices 190 may only be configured for a single such connection at a time. If a connection to network 195 exists using this circuitry of client device 190, then such an embodiment of client device 190 is unable to connect to camera device 110 with high-speed wireless connection 137 until the connection to network 195 is terminated. In such embodiments, a disconnect from network 195 may be used as a trigger for a new data query as described above, and this information may further be used as part of the high-speed connection status check. In still further embodiments, any other such data available to client device 190 that may be used to estimate a connection success probability may be used as part of the high-speed connection status check.

Once the high-speed connection status check of operation 308 determines that a high-speed connection 137 is expected to succeed, then operation 310 involves communicating, in response to the high-speed connection status check, a connection communication from the client device 190 to the camera device 110. This connection communication instructs the camera device 110 to activate high-speed wireless circuitry 130 of the wearable camera device 110. Operation 312 then involves establishing a high-speed wireless connection 137 to the wearable camera device 110. As described above, while the high-speed wireless connection status check attempts to confirm that high-speed wireless connection 137 will be successfully made prior to high-speed circuitry 130 powering on, this connection 137 may still fail. In such embodiments, a reconnection counter or a timer may be used as threshold values. If a connection is not successful within the threshold criteria, a communication may be sent from client device 190 to camera device 110 instructing camera device 110 to power down high-speed circuitry 110. Client device 190 may then establish a reconnect trigger to periodically attempt to reconnect, beginning from any of operations 302 through 310. This may be repeated until the transfer of first camera data to client device 190 is successful.

When high-speed wireless connection is successfully established, then operation 314 involves receiving the first camera data from memory 134 at client device 190 via the high-speed wireless connection 137. In certain additional embodiments, after the first camera data is transferred completely or the first camera data transfer is interrupted and a reconnection threshold is reached, the client device 190 communicates a sleep-state command to camera device 110 that instructions camera device 110 to power off high-speed circuitry 130. In other embodiments, high-speed circuitry 130 may be powered down automatically at camera device 110 without such a sleep-state command from client device 190.

In the methods above, the operations are described in particular order, but it is to be understood that in various alternative embodiments, elements may occur simultaneously or in a different order than the order specifically described for methods 200 and 300. Additionally, other operations may be present between the described operations within the scope of the innovations presented herein.

Additionally, as mentioned above, other types of systems and devices may be used with the handshaking and communication methods described above. For example, in one embodiment, a client device 190 may be connected to a glasses device including a display 111, where the glasses device is similar to either glasses device described in FIG. 7 or 8. Such a glasses device includes high-speed circuitry 130 and low-power circuitry 120. In one such embodiment, an application operating on client device 190 such as a location application 958 is operative to provide visual location directions to a user via display 111. The client device may, based on a location trigger from a location sensor on device 190, initiate transfer of direction data to memory 134 for presentation on display 111. Such an embodiment may operate similar to methods 200 or 300 above, but with a handshaking triggered by client device 190 communicating the presence of data for transfer to the display device (e.g. eyeglasses with an integrated display), and the display device responding via a low-power wireless connection that it is or is not ready to receive the data. The low-power wireless connection is then similarly used to allow the client device to communicate an instruction for high-speed circuitry 130 to be powered on once client device 190 has determined that a high-speed wireless connection is likely to be successfully established. The high-speed wireless connection may then be used to receive video, text, and/or image data for presentation on a display or using an output of the device. Other example methods will be apparent from the descriptions provided herein, and may include communication of any type of data, including image data, video data, audio data, touch input data, sensor data, or any other such data according to various different embodiments.

Figure 4:
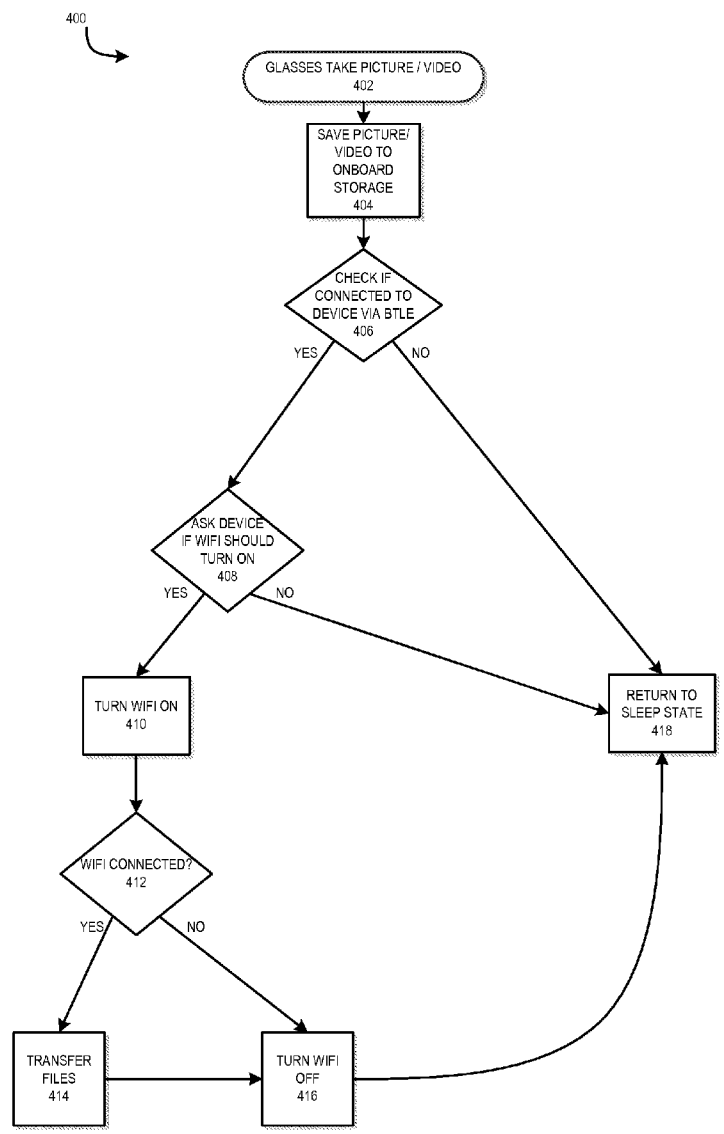
FIG. 4 is a flow diagram illustrating aspects of communication handshaking according to some example embodiments.

FIG. 4 is a flow diagram illustrating aspects of communication handshaking according to some example embodiments. Method 400 of FIG. 4 is an embodiment of a handshake initiated by a pair of wearable glasses including a camera, such as the glasses 31 of FIG. 6. The glasses of method 400 include Bluetooth LE circuitry for a lower-power wireless connection and Wi-Fi circuitry for a high-speed wireless connection. Operation 402 begins with the classes capturing camera data such as a picture or a video using the camera integrated with the glasses. In operation 404, the camera data is saved to an onboard storage memory. In operation 406, a check is performed to determine if the classes are connected to a client device using the Bluetooth LE circuitry of the glasses. If such a connection is not available, the glasses return to a low-power sleep state in operation 418. If such a connection is present or available for initiation by the glasses, then the connection is used to ask client device if the Wi-Fi circuitry of the glasses should be powered on.

If a negative response is received from the client device in response to this query, then the glasses again return to a sleep state in operation 418. As described above in methods 200 and 300, in certain embodiments a high-speed connection status check or other operation predicting a successful high-speed wireless connection is performed at a client device. This is done to reduce power wasted at the glasses by an unnecessary power on of high-speed circuitry. If a communication is received indicating the glasses should use power attempting to establish a high-speed connection, then in operation 410 the glasses power on the high-speed wireless circuitry of the glasses. In operation 412, an attempt to connect the glasses to the client device using the Wi-Fi circuitry is made. This may use Wi-Fi direct, or any Wi-Fi connection according to IEEE specifications including any 802.11 specification. If the Wi-Fi connection is successful, then data is transferred from the glasses to the client device via Wi-Fi in operation 414, and in operation 416 the Wi-Fi circuitry is powered down. This power down may be in response to a verification that the camera data has been successfully received at the client device, or may be in response to any other such power trigger. In some embodiments, a low-power processor of the glasses may monitor a battery level, and automatically power down the Wi-Fi circuitry when a power threshold is reached. A low-power communication may be used to send a battery alert to a client device in such embodiments. In any event, the power down of the Wi-Fi circuitry in operation 416 is then accompanied by the glasses returning to a sleep state in operation 418.

While various embodiments described herein focus on individual operations of data receipt or transmission, with a process initiated either on a client device or the related connected device, any device described herein may both transmit and receive data, and may both operate to initiate handshaking and to interact with handshaking initiated by other devices. For example, a single camera device 110 may both generate and transfer camera data to client device 190 and receive data from client device 190 for presentation on display 111. Such operations may be performed by a single device both with the handshaking initiated by camera device 110 and initiated by client device 190 in different data transfer operations for the same device. Additionally, multiple transfer operations may be attempted in various combinations of the elements described above. For example, first camera data may be transmitted successfully, and second camera data may subsequently be part of an unsuccessful transmission attempt, with third and fourth subsequent connection communications and responses attempting to transmit the second camera data. Elements of such operations may be combined in different ways, with different triggers used to initiate different elements of the handshaking and communication processes.

Figure 5:
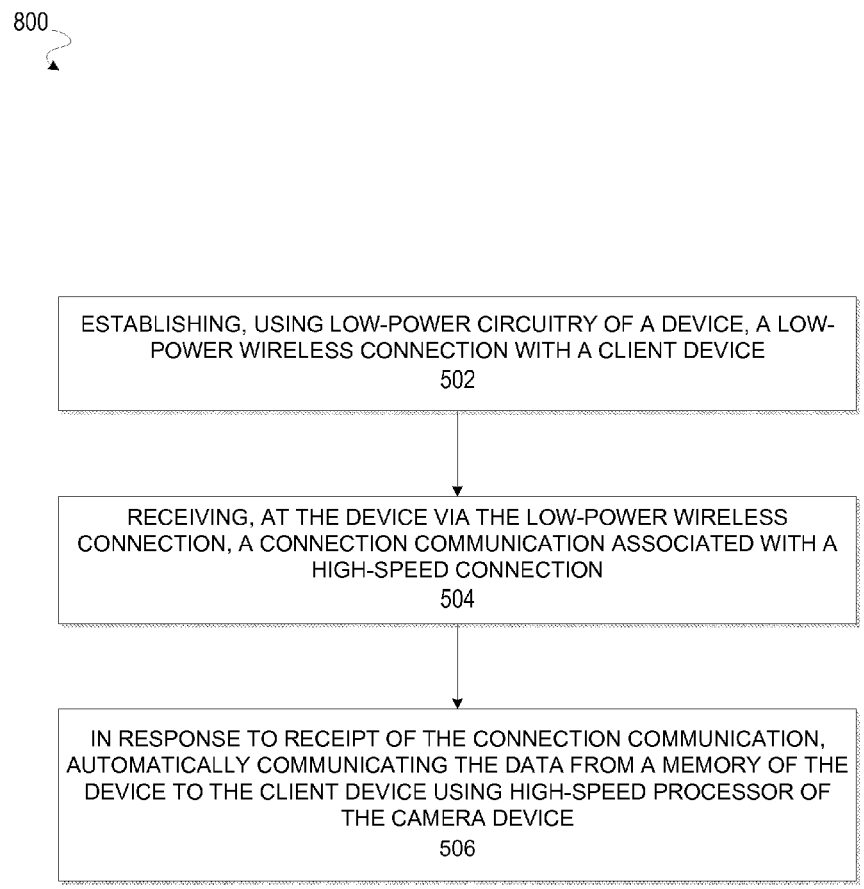
FIG. 5 is a diagram illustrating a method of communication handshaking according to some example embodiments.

FIG. 5 is a diagram illustrating a method of communication handshaking according to some example embodiments. Method 500 of FIG. 5 illustrates a basic operation of a device such as a camera device 110 having low-power circuitry 120 and high-speed circuitry 130. The device interacts with a client device such as client device 190 using an initial low-power communication, with low-power communications used to establish an associated high-speed connection, and data transfer on the high-speed connection based on handshaking involving the low-power connection.

Operation 502 of method 500 thus involves establishing, using low-power circuitry of a device such as camera device 110, a low-power wireless connection with a client device. Operation 504 then involves receiving, at the camera device via the low-power wireless connection, a connection communication associated with a high-speed connection. Operation 506 then involves, in response to receipt of the connection communication, automatically communicating the data from a memory of the device to the client device using high-speed processor of the device. While particular camera devices, glasses with camera elements, and glasses with display elements are described herein, additional embodiments may include any device having low-power circuitry and separate high-speed circuitry described herein. Additional embodiments of method 500 may then use particular handshaking operations described herein to reduce power usage at one device.

Figure 6:
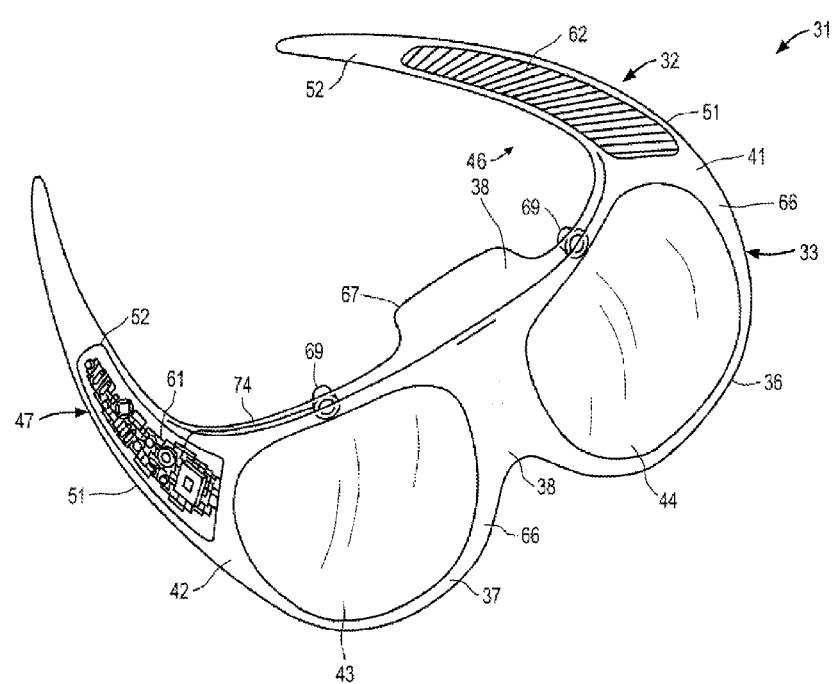
FIG. 6 is a front perspective view of one embodiment of a camera device.

FIG. 6 is a front perspective view of one embodiment of a camera device that may be used with the handshaking and data transfer operations described herein. FIG. 6 shows aspects of certain embodiments illustrated by a front perspective view of glasses 31. In various embodiments, glasses 31 may be an implementation of camera device 110. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as curved or arcuate piece, for coupling to the ear of the user. In one embodiment the front piece 33 can be formed from a single piece of material, so as to have a unitary or integral construction. In one embodiment, such as illustrated in FIG. 6, the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 4 7 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. As described above, the computer 61 comprises low-power circuitry, high-speed circuitry, and a display processor. Various other embodiments may include these elements in different configurations or integrated together in different ways. Additional details of aspects of computer 61 may be implemented as illustrated by camera device 210 discussed below.

The computer 61 additionally includes a battery 62 or other suitable portable power supply. In one embodiment, the battery 62 is disposed in one of the temple pieces 46 or 47. In the glasses 31 shown in FIG. 6 the battery 62 is shown as being disposed in left temple piece 46 and electrically coupled using connection 74 to the remainder of the computer 61 disposed in the right temple piece 47. The one or more input and output devices can include a connector or port suitable for charging a battery 62 accessible from the outside of frame 32, a wireless receiver, transmitter or transceiver (not shown) or a combination of such devices.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors.

Figure 7:
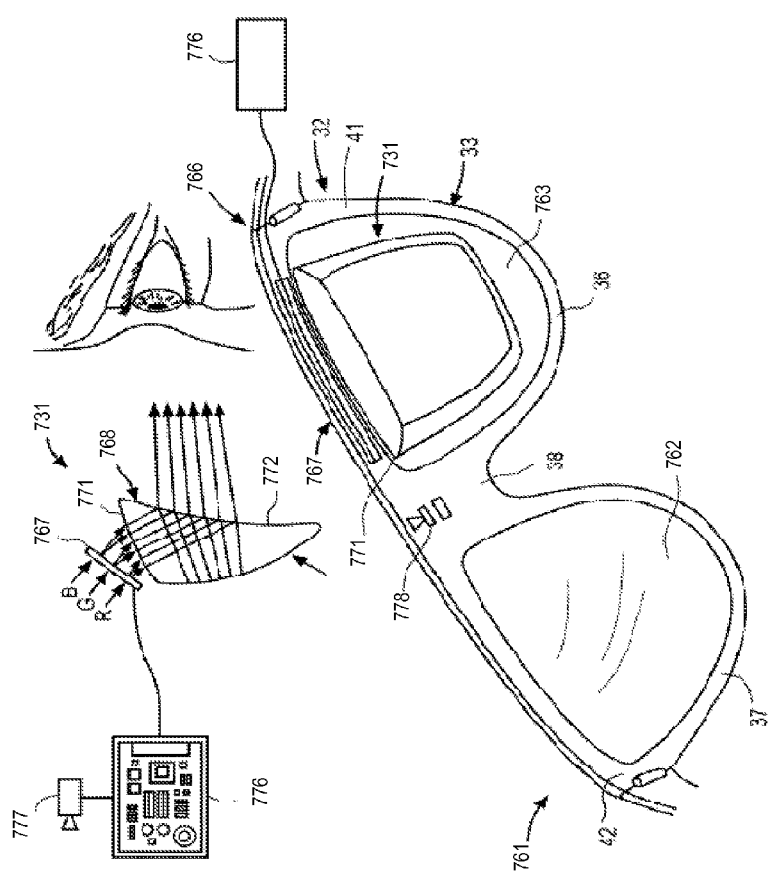
FIGS. 7 and 8 illustrate camera devices including displays according to certain example embodiments.
Figure 8:
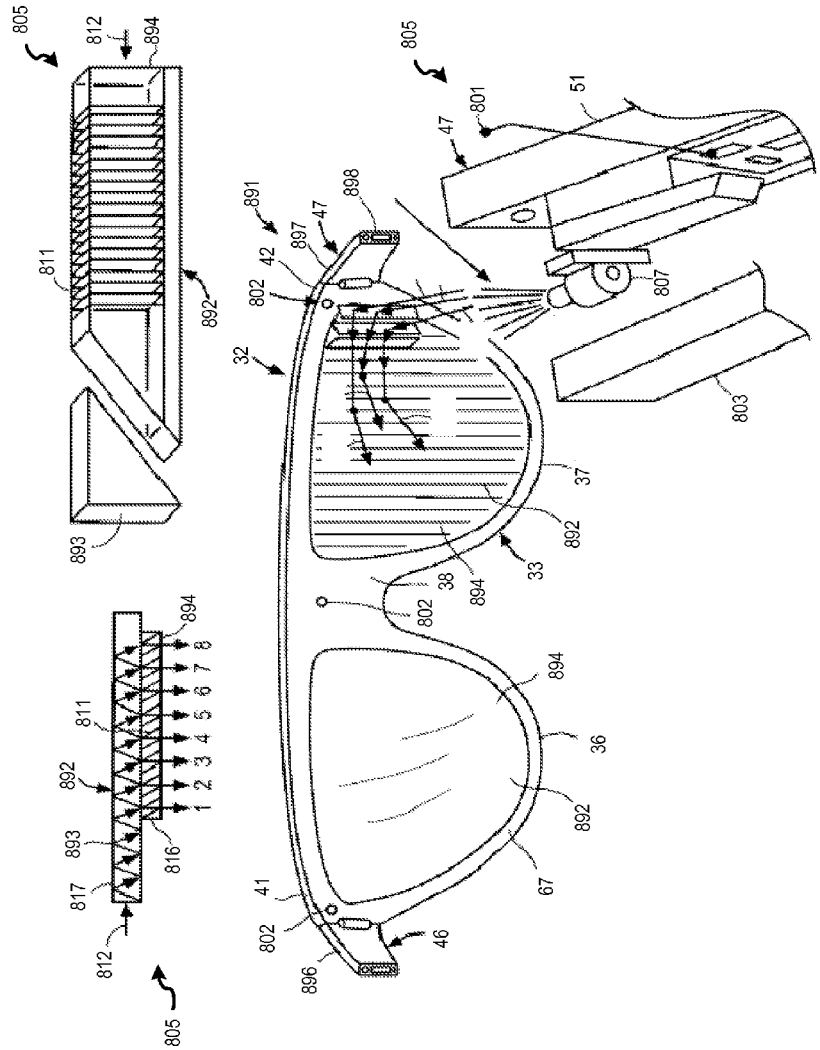

FIGS. 7 and 8 illustrate camera devices including displays according to certain example embodiments. FIGS. 7 and 8 then illustrate two additional embodiments of glasses which include display systems. In various different embodiments, such display systems may be integrated with the camera devices discussed above, or may be implemented as wearable devices without an integrated camera. In embodiments without a camera, power conservation systems and methods continue to operate for the display system and other such systems in a manner similar to what is described above for the image processor and data transfer elements of the camera devices.

FIG. 7 illustrates glasses 761 having an integrated display 731. The glasses 761 can be of any suitable type, including glasses 31, and like reference numerals have been used to describe like components of glasses 761 and 31. For simplicity, only a portion of the glasses 761 are shown in FIG. 7. Headwear or glasses 761 can optionally include left and right optical lenses 762, 763 secured within respective left and right optical element holders 36, 37. The glasses 761 can additionally include any suitable left and right optical elements or assemblies 766, which can be similar to any of the optical elements or assemblies discussed herein including optical elements 43, 44 of glasses 31. Although only one optical assembly 766 is shown in FIG. 7, it is appreciated that an optical assembly 766 can be provided for both eyes of the user.

In one embodiment, the optical assembly 766 includes any suitable display matrix 767. Such a display matrix 767 can be of any suitable type, such as a liquid crystal display (LCD), a liquid crystal on silicon (LCOS) display, an organic light-emitting diode (OLED) display, or any other such display. The optical assembly 766 also includes an optical layer or layers 768, which can be include lenses, optical coatings, prisms, mirrors, waveguides, holograms, spatial light modulators, and other optical components in any combination. In the embodiment illustrated in FIG. 7, the optical layer 768 is an optical element having a suitable size and configuration and including a first surface 771 for receiving light from display matrix 767 and a second surface 772 for emitting light to the eye of the user. The optical element extends over all or at least a portion of the optical element holder 36, 37 so to permit the user to see the second surface 772 of the optical element when the eye of the user is viewing through the corresponding optical element holder 36. The first surface 771 faces upwardly from the frame 32 and the display matrix 767 overlies the optical element so that photons and light emitted by the display matrix 767 impinge the first surface 771. The optical element is sized and shaped so that the light is refracted when entering and exiting the optical element to direct the light towards the eye of the user. The light may also be focused by internal reflections of curved surfaces of the optical element. The second surface 772 can be convex so as to direct the light towards the center of the eye. The optical element can optionally be sized and shaped so as to magnify the image projected by the display matrix 767, and the light travels through the optical element so that the image viewed from the second surface 772 is larger in one or more dimensions than the image emitted from the display matrix 767.

Glasses 761 can include any suitable computing system, including any of the computing devices disclosed herein, such as computer 81 or machine 1100. In the embodiment of FIG. 7, computer 776 powered by a suitable rechargeable battery (not shown), which can be similar to battery 82, is provided. Computer 776 can receive a data stream from one or more image sensors 777, which may be similar to camera 89, with image sensors 777 positioned such that the image sensor 777 senses the same scene as an eye of a wearer of glasses 761. Additional sensors, such as outwardly-facing geometry sensor 778, can be used for any suitable purpose, including the scanning and capturing of three-dimensional geometry that may be used by computer 776 with data from image sensors 777 to provide information via digital display matrix 767.

Computer 776 is implemented using the processor elements of the camera device 210, including image processor 212, high-speed circuitry 230, and low-power circuitry 220. Computer 776 may additionally include any circuitry needed to power and process information for display matrix 767, which may be similar to display 111. In certain embodiments, image processor 212 or high-speed processor 232 may include circuitry to drive display matrix 767. In other embodiments, separate display circuitry may be integrated with the other elements of computer 776 to enable presentation of images on display matrix 767.

FIG. 8 illustrates another example embodiment, shown as glasses 891, having another implementation of a display. Just as with glasses 761, glasses 891 can be of any suitable type, including glasses 31, and reference numerals have again been used to describe like components of glasses 891 and 761. Glasses 891 include optical lenses 892 secured within each of the left and right optical element holders 36, 37. The lens 892 has a front surface 893 and an opposite rear surface 894. The left and right end portions 41,42 of the frame front piece 33 can include respective left and right frame extensions 896, 897 that extend rearward from the respective end portions 41, 42. Left and right temple pieces 46, 47 are provided, and can either be fixedly secured to respective frame extensions 896, 897 or removably attachable to the respective frame extensions 896, 897. In one embodiment, any suitable connector mechanism 898 is provided for securing the temple pieces 46, 47 to the respective frame extension 896, 897.

Glasses 891 includes computer 801, and just as with computer 776, computer 801 may be implemented using the processor elements of camera device 210, including image processor 212, high-speed circuitry 230, and low-power circuitry 220, and computer 801 may additionally include any circuitry needed to power and process information for the integrated display elements.

Sensors 802 include one or more cameras, which may be similar to camera 214 and/or other digital sensors that face outward, away from the user. The data feeds from these sensors 802 go to computer 801. In the embodiment of FIG. 8 the computer 801 is disposed within the first portion 51 of right temple piece 47, although the computer 801 could be disposed elsewhere in alternative embodiments. In the embodiment of FIG. 8, right temple piece 47 includes removable cover section 803 for access to computer 801 or other electronic components of glasses 891.

Glasses 891 include optical elements or assemblies 805, which may be similar to any other optical elements or assemblies described herein. One optical assembly 805 is shown, but in other embodiments, optical assemblies may be provided for both eyes of a user. In the illustrated embodiment, optical assembly 805 includes projector 807, outcoupling elements 811, first layer 816, second layer 817, lens 892, front surface 893, and rear surface 894. In one example embodiment, lens 892 is a waveguide that uses total internal reflection to guide photons of light 812 from a projector 807 to an eye of a user. In certain embodiments, projector 807 is a monochrome or red green and blue (RGB) laser projector what a scanning motion actuated using a scanning mirror, a scanning fiber-optic fiber, or galvanometer. In another example embodiment, projector 807 comprises an ordinary display matrix such as an LCD, OLED, or LCOS display matrix coupled with a collimator lens, such that the light from the display matrix travels through the collimator lens to focus a projected image at a comfortable viewing distance for the viewer (e.g. focusing the image at a perceived distance of 0.5 meters to infinity from the viewer's eye.) During operation, an optical source such as a projector is disposed in one of the arms or temples of the glasses, and is shown in right temple piece 47 of glasses 891. The computer 801 connects to the projector 807. The optical assembly 805 includes one or more outcoupling elements 811. In various example embodiments, outcoupling elements 811 may comprise a hologram, optical strips, or optical facets. In embodiments where lens 892 uses total internal reflection, outcoupling elements 811 operate to take light that is trapped inside lens 892 via total internal reflection and outcoupling elements 811 give the light 712 a controlled and directed means to escape and exit toward the viewer's eye. In the illustrated embodiment where outcoupling elements comprise optical strips, outcoupling elements 811 are spaced apart across the width of lens 892, as illustrated by lens 892 in right optical element holder 37 of FIG. 8. In other embodiments, the outcoupling elements 811 may be spaced apart across a depth of the lens 892 between the front surface 893 and the rear surface 894 of lens 892 as shown in the partial view of lens 892 in the top corner of FIG. 8.

During operation, computer 801 sends data to projector 807. A plurality of light paths 812 are depicted, showing the paths of respective photons emitted by the projector 807. The path arrows illustrate how lenses or other optical elements direct the photons on paths 812 that take the photons from the projector 807 to the lens 892. As the photons then travel across the lens 892, the photons encounter a series of outcoupling elements 811. When a particular photon encounters a particular outcoupling element 811, it is either redirected towards the user's eye, or it passes to the next outcoupling element 811. Specific photons or beams of light may be controlled by a combination of modulation of projector 807 and modulation of outcoupling elements 811. Outcoupling elements 811 may, in certain embodiments, be controlled through mechanical, acoustic, or electromagnetic signals initiated by computer 801. Alternatively, in some example embodiments, outcoupling elements 811 do not need to be controlled, but may passively deflect some or all of the photons of light 812 out of a waveguide.

In one example implementation of the outcoupling elements 811, each strip 811 can use Polymer Dispersed Liquid Crystal to be opaque or transparent at a given instant of time, per software command from computer 801. In a different example implementation of the outcoupling elements 811, each outcoupling element 811 can have a specific wavelength of light that it redirects toward the user, passing all the other wavelengths through to the next outcoupling element 811. In a different example implementation of the outcoupling elements 811, each strip 811 can have certain regions of the strip 811 that cause redirection with other regions passing light, and the projector 807 can use high precision steering of the light beams to target the photons at the desired region of the particular intended outcoupling element 811.

In the embodiment of lens 892 illustrated in the top left of FIG. 8, outcoupling elements 811 are disposed in and spaced apart along the width of a first layer 816 of the lens 892, which is secured in a suitable manner to a second layer 817 of the lens 892. In one embodiment, the front surface 893 is formed by the second layer 817 and the rear surface 894 is formed by the first layer 816. The second layer 817 can be provided with reflective coatings on at least a portion of the surfaces thereof so that the light 812 bounces off such surfaces so as to travel along the layer 817 until the light encounters a strip 811 provided in the first layer 816, and is either redirected towards the eye of the user or continues on to the next strip 811 in the manner discussed above.

While the methods described above present operations in a particular order, it will be appreciated that alternate embodiments may operate with certain operations occurring simultaneously or in a different order. In many such embodiments, the order and timing of operations may vary between instances of the operation, with the exact timing managed by a low-power processor such as the low-power processor 122 operating to reduce power usage, and manage transfer of data via a high-speed wireless connection 137 while limiting unnecessary power usage by high-speed circuitry 130.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
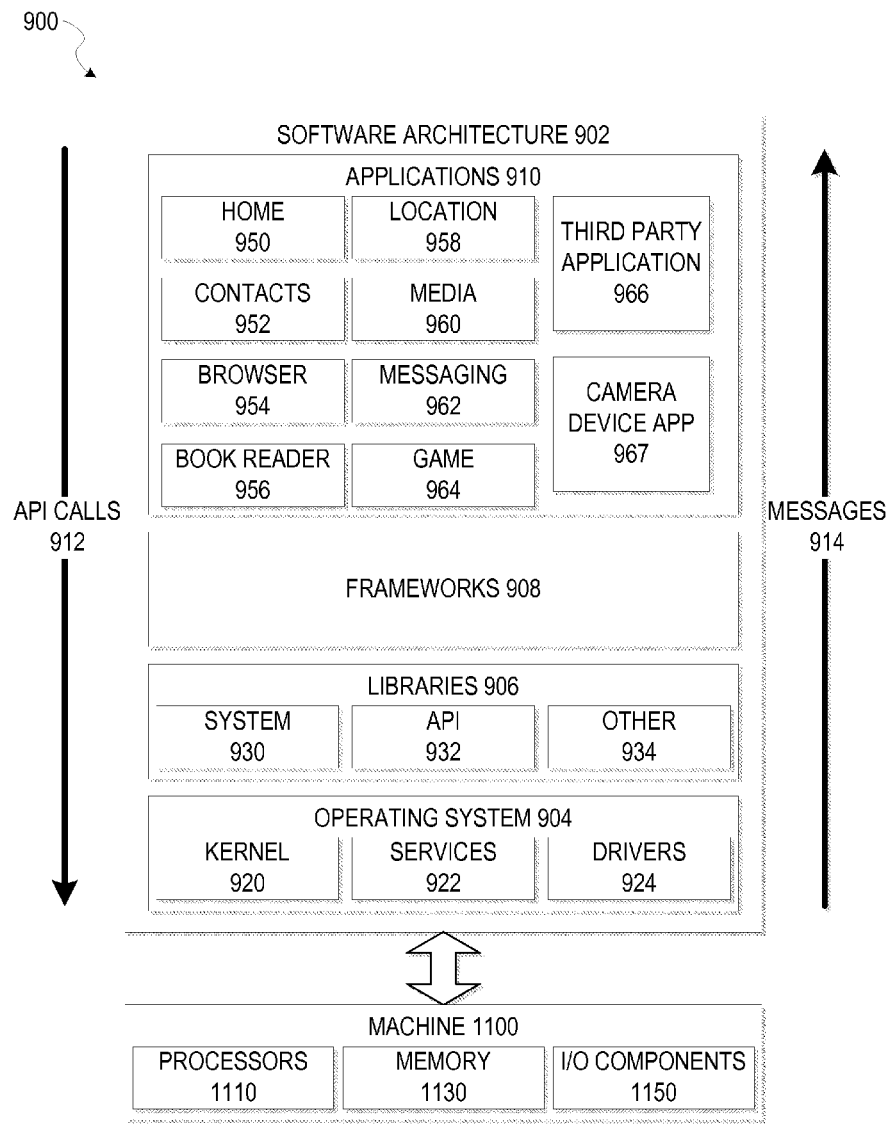
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. Aspects of software 902 may, in various embodiments, be used to initiate and manage aspects of handshaking and data transfer described herein. For example, various aspects of communication protocols such as link layer operations of wireless connections may be managed as background processes below the application level within software 902. In other embodiments, any aspects of connections described herein may be controlled or adjusted by an application of software 902 operating on a device such as client device 190 or camera device 110. FIG. 9 is merely a non-limiting example of a software architecture, and it will be appreciated that many other architectures can be implemented to facilitate the functionality described herein. In various embodiments, the software 902 is implemented by hardware such as machine 1100 of FIG. 11 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device 190, server computer of a server system 198, or any other device described herein may operate using elements of software 902. Devices such as the camera device 110 may additionally be implemented using aspects of software 902, with the architecture adapted for operating using low-power circuitry (e.g., low-power circuitry 120) and high-speed circuitry (e.g., high-speed circuitry 130) as described herein.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera device 210, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Figure 10:
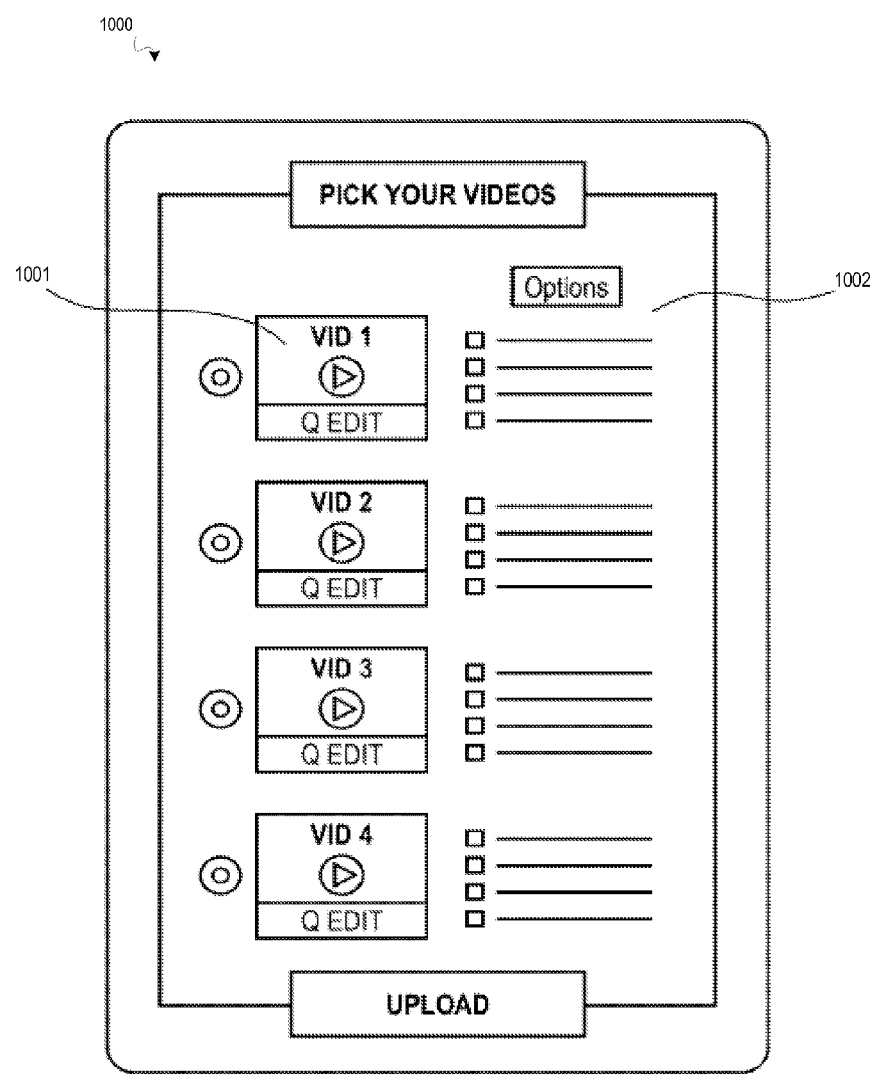
FIG. 10 illustrates an example user interface for a client device operating an application in communication with a separate wirelessly connected camera device according to some example embodiments.

Embodiments described herein may particularly interact with a camera device application 967. Such an application 967 may interact with I/O components 1150 to establish various wireless connections with devices such as the camera device 210, and to present details of the camera device 210 to a user of the machine 1100. Camera device application 967 may communicate with the camera device 210 to automatically request that camera data be transferred from the camera device 210 to the machine 1100. For example, when camera device application 967 is first opened on the machine 1100, the application 967 may automatically check for the availability of a low-power wireless connection 125 to the camera device 110. If no such connection 125 is available, the camera device application 967 may still provide additional functionality, for example operating as a social network communication application with images or videos that have either been previously downloaded from the camera device 110 or captured a camera of client device 190. If, however, low-power wireless connection 125 is available when camera device application 967 is first started, FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user. For instance, the user may physically touch the mobile device 1000, and in response to the touch, the mobile device 1000 may determine tactile data such as touch location, touch force, or gesture motion. In various example embodiments, the mobile device 1000 displays a home screen operable to launch applications or otherwise manage various aspects of the mobile device 1000. In some example embodiments, the home screen provides status information such as battery life, connectivity, or other hardware statuses. The user can activate user interface elements by touching an area occupied by a respective user interface element. In this manner, the user interacts with the applications of the mobile device 1000. For example, touching the area occupied by a particular icon included in the home screen causes launching of an application corresponding to the particular icon.

Many varieties of applications (also referred to as "apps") can be executing on the mobile device 1000, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app such as SNAPCHAT® that, consistent with some embodiments, allows users to exchange ephemeral messages that include media content. In this example, the social messaging app can incorporate aspects of embodiments described herein. Similarly, in certain embodiments, data transferred from a camera device described herein may have an ephemeral time period associated with the image based on settings in the camera, such that an application operating on a client device will automatically delete images based on such settings. In other embodiments, such data may be stored indefinitely on a client device, but with associated setting such that when the camera data is transferred from a client device to a receiving device, the camera data will have such an associated ephemeral time period where the receiving device will delete the camera data after the ephemeral time period. Other embodiments may operate with no such ephemeral time period.

Such a social messaging application may integrate the functionality of the camera device application 967 to automatically integrate camera data from the camera device 110 into the social messaging application. Mobile device 1000 of FIG. 10 shows an example user interface for display of camera data 1001 from camera device 110 on mobile device 1000. Camera data 1001 is shown as displayed on a screen of mobile device 1000, along with option data 1002. Each content element, including camera data 1001, is displayed on the screen of mobile device 1000 in order. Option data 1002 may include details from camera device 210 such as a date and time of capture, or other information about the images. User interaction with the camera data 1001 on the mobile device 1000 may be used to process or modify the camera data 1001. Swiping up or down on the screen of mobile device 1000 may scroll through different images or videos from camera device 110 or a combination of camera data from camera device 210 and mobile device 1000. Swiping to one side of the display may delete particular camera data 1001, and swiping to the other side may present additional options for communicating the camera data 1001 via a network to other devices or users.

When mobile device 1000 connects with a camera device 210 to download camera data 1001 from the camera device 110, the list of data including camera data 1001 may be updated to include new images and videos from camera device 110. Additionally, the mobile device 1000 may include a user interface that receives status information from the camera device 210, including battery data, memory use data, or any other such status information available from the camera device 110.

Figure 11:
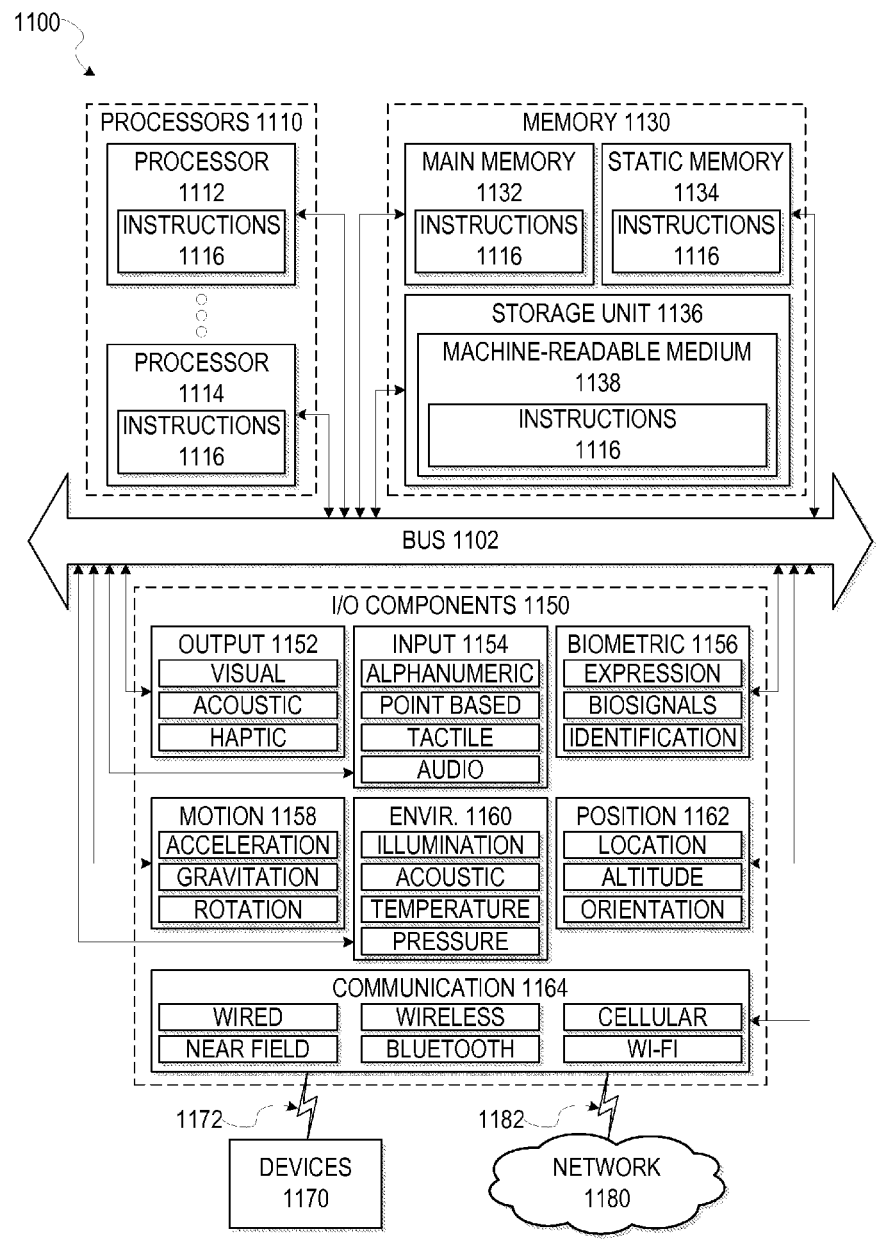
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
verifying, by a client device, an established low-power wireless connection from the client device to a wearable camera device;
communicating via the low-power wireless connection, a new data query;
receiving, from the wearable camera device in response to the new data query, a new camera data message identifying first camera data stored on the wearable camera device;
performing, by the client device, a high-speed connection status check;
communicating, in response to the high-speed connection status check, a connection communication from the client device to the wearable camera device, wherein the connection communication instructs the wearable camera device to activate high-speed wireless circuitry of the wearable camera device;
establishing a high-speed wireless connection to the wearable camera device; and
receiving the first camera data via the high-speed wireless connection.

2. The method of claim 1 further comprising:
communicating, from the client device to the wearable camera device using the low-power wireless connection, a sleep-state communication instructing the wearable camera device to power down high-speed circuitry associated with the high-speed wireless connection.

3. The method of claim 2 wherein communication of the new data query is triggered by an application launch.

4. The method of claim 2 wherein communication of the new data query is triggered by a periodic data check timer.

5. The method of claim 2 wherein the high-speed connection is an Institute of Electrical and Electronics Engineers (IEEE) 802.11 (Wi-Fi) connection.

6. The method of claim 5 wherein communication of the new data query is triggered by identification of a network disconnect associated with Wi-Fi circuitry of the client device, wherein the high-speed connection is established using the Wi-Fi circuitry of the client device.

7. The method of claim 6 wherein the low-power connection is a Bluetooth low energy (LE) connection.

8. The method of claim 7 further comprising:
interrupting operation of an application prior to establishing the high-speed wireless connection; and
resuming operation of the application following reception of the first camera data.

9. The method of claim 2 further comprising:
establishing the low-power wireless connection using a background process operating on the client device.

10. The method of claim 2 wherein the high-speed connection status check comprises a high-speed connection success prediction made by the client device.

11. The method of claim 10 wherein the high-speed connection success prediction by the client device indicates a threshold likelihood of connection success based on a current use status of client-device high-speed wireless circuitry.

12. The method of claim 11 wherein the high-speed connection success prediction is further based on a client device user input received in response to a user prompt presented at a display of the client device.

13. The method of claim 2 further comprising:
receiving, prior to establishing the high-speed wireless connection, a connection unsuccessful communication associated with the high-speed wireless connection from the wearable camera device; and
communicating a network adjustment command from the client device to the wearable camera device via the low-power wireless connection.

14. The method of claim 2 further comprising, after powering down the high-speed processor and the high-speed wireless circuitry after completion of the communication of the first camera data to the client device:
communicating via the low-power wireless connection, a second new data query;
receiving, from the wearable camera device in response to the second new data query, a second new camera data message identifying second camera data stored on the wearable camera device;
performing, by the client device, a second high-speed connection status check;
communicating, via the low-power wireless connection in response to the second high-speed connection status check, a second connection communication from the client device to the wearable camera device, wherein the second connection communication instructs the wearable camera device to activate the high-speed wireless circuitry of the wearable camera device.

15. The method of claim 14 further comprising:
failing to establishing the high-speed wireless connection within a threshold time period; and
communicating, from the client device to the wearable camera device using the low-power wireless connection, a second sleep-sleep state communication instructing the wearable camera device to power down high-speed circuitry without receiving the second camera data at the end of the threshold time period.

16. A client device comprising:
at least one processor configured to perform a high-speed connection status check;
a memory coupled to the at least one processor;
Bluetooth low energy (LE) circuitry configured to:
establish a low-power wireless connection with a wearable camera device;
communicate via the low-power wireless connection, a new data query;

receiving, from the wearable camera device in response to the new data query, a new camera data message identifying first camera data stored on the wearable camera device; and Wi-Fi circuitry configured to:
  communicate, in response to the high-speed connection status check, a connection communication from the client device to the wearable camera device, wherein the connection communication instructs the wearable camera device to activate high-speed wireless circuitry of the wearable camera device;

establish a high-speed wireless connection to the wearable camera device; and receive the first camera data.

17. The client device of claim 16 further comprising:
a cellular modem configured to communicate the first camera data to an application server using an application operating on the at least one processor;
wherein the Bluetooth LE circuitry is further configured to communicate a sleep-sleep state communication to the wearable camera device instructing the wearable camera device to power down high-speed circuitry associated with the high-speed wireless connection.

18. A non-transitory computer readable medium comprising computer readable instructions that, when executed by one or more processors of a client device, cause the client device to:
establish a low-power wireless connection from the client device to a wearable camera device;
communicate via the low-power wireless connection, a new data query;
receiving, from the wearable camera device in response to the new data query, a new camera data message identifying first camera data stored on the wearable camera device;
perform, by the client device, a high-speed connection status check;
communicate, in response to the high-speed connection status check, a connection communication from the client device to the wearable camera device, wherein the connection communication instructs the wearable camera device to activate high-speed wireless circuitry of the wearable camera device;
establish a high-speed wireless connection to the wearable camera device; and
receive the first camera data via the high-speed wireless connection; and
communicate, from the client device to the wearable camera device using the low-power wireless connection, a sleep-sleep state communication instructing the wearable camera device to power down high-speed circuitry associated with the high-speed wireless connection.

19. The non-transitory computer readable medium of claim 18 wherein the high-speed connection is a Wi-Fi direct connection.

20. The non-transitory computer readable medium of claim 18 wherein the high-speed connection is a standard Bluetooth connection.

* * * * *

UNITED STATES PATENT AND TRADEMARK OFFICE
CERTIFICATE OF CORRECTION

PATENT NO. : 9,668,217 B1  
APPLICATION NO. : 14/712179  
DATED : May 30, 2017  
INVENTOR(S) : Bamberger et al.

Page 1 of 1

It is certified that error appears in the above-identified patent and that said Letters Patent is hereby corrected as shown below:

On the Title Page

Item (71), in "Applicant", in Column 1, Line 1, delete "Snapchat," and insert --Snap-- therefor Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*